(12) United States Patent
Wu et al.

(10) Patent No.: US 11,715,867 B2
(45) Date of Patent: Aug. 1, 2023

(54) END COVER ASSEMBLY, BATTERY CELL, BATTERY MODULE AND DEVICE

(71) Applicant: Contemporary Amperex Technology Co., Limited, Ningde (CN)

(72) Inventors: Ningsheng Wu, Ningde (CN); Chengyou Xing, Ningde (CN); Yuanbao Chen, Ningde (CN); Peng Wang, Ningde (CN); Quankun Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/113,585

(22) Filed: Dec. 7, 2020

(65) Prior Publication Data

US 2021/0328313 A1 Oct. 21, 2021

Related U.S. Application Data

(63) Continuation of application No. PCT/CN2020/110837, filed on Aug. 24, 2020.

(30) Foreign Application Priority Data

Apr. 17, 2020 (CN) .......................... 202010306786.5

(51) Int. Cl.
*H01M 50/591* (2021.01)
*H01M 50/148* (2021.01)
(Continued)

(52) U.S. Cl.
CPC ....... *H01M 50/591* (2021.01); *H01M 50/148* (2021.01); *H01M 50/547* (2021.01);
(Continued)

(58) Field of Classification Search
CPC ........... H01M 50/591; H01M 2220/20; H01M 50/148; H01M 50/593; H01M 50/588; H01M 50/552; H01M 50/547
See application file for complete search history.

(56) References Cited

U.S. PATENT DOCUMENTS 5,583,380 A * 12/1996 Larsen .............. H01L 21/76816
257/690
6,132,900 A 10/2000 Yoshizawa et al.
(Continued)

FOREIGN PATENT DOCUMENTS

CN 202616327 U 12/2012
CN 205197849 U 5/2016
(Continued)

OTHER PUBLICATIONS

Machine translation of JP-2008305646-A, Suzuki (Year: 2008).*
(Continued)

*Primary Examiner* — Brian R Ohara
*Assistant Examiner* — Brent C Thomas
(74) *Attorney, Agent, or Firm* — East IP P.C.

(57) ABSTRACT

The embodiments of the application provides an end cover assembly, a battery cell, a battery module and a device, the end cover assembly is used for the battery cell, the end cover assembly includes an end cover; an electrode terminal disposed on the end cover; an insulating member for insulating the electrode terminal and the end cover and disposed to surround the electrode terminal; wherein the insulating member abuts the electrode terminal, at least one of the insulating member and the electrode terminal is provided with a stress relief groove, the stress relief groove is configured to absorb stress generated by the electrode terminal's abutting the insulating member.

12 Claims, 12 Drawing Sheets

(51) Int. Cl.
  *H01M 50/547* (2021.01)
  *H01M 50/552* (2021.01)
  *H01M 50/588* (2021.01)
  *H01M 50/593* (2021.01)

(52) U.S. Cl.
  CPC ....... *H01M 50/552* (2021.01); *H01M 50/588* (2021.01); *H01M 50/593* (2021.01); *H01M 2220/20* (2013.01)

(56) References Cited

U.S. PATENT DOCUMENTS

| | | | |
|---|---|---|---|
| 2017/0222194 A1* | 8/2017 | Kajita | B29C 45/2628 |
| 2018/0083256 A1 | 3/2018 | Marasco et al. | |
| 2018/0366694 A1* | 12/2018 | Liu | H01M 50/172 |

FOREIGN PATENT DOCUMENTS

| | | | |
|---|---|---|---|
| CN | 106784450 A | | 5/2017 |
| CN | 107359290 A | | 11/2017 |
| CN | 107732042 A | | 2/2018 |
| CN | 110176558 A | | 8/2019 |
| CN | 209447912 U | | 9/2019 |
| CN | 110323367 A | | 10/2019 |
| EP | 2 317 588 A1 | | 5/2011 |
| JP | 2008305646 A | * | 12/2008 |
| JP | 2008305646 A | | 12/2008 |
| JP | 2014154291 A | | 8/2014 |
| JP | 2016197517 A | | 11/2016 |
| WO | 2014002819 A1 | | 1/2014 |
| WO | 2019148662 A1 | | 8/2019 |
| WO | 2020073887 A1 | | 4/2020 |

OTHER PUBLICATIONS

International Search Report for PCT/CN2020/110837, dated Jan. 18, 2021 (10 pages).
The extended European search report for European Application No. 20807999.6, dated Sep. 29, 2021, 7 pages.
The First Office Action dated Sep. 5, 2022 for Japanese Application No. 2021-547263 8 pages.
The First Office Action for CN Application No. 202010306786.5, dated Jun. 22, 2022, 13 pages.

* cited by examiner

END COVER ASSEMBLY, BATTERY CELL, BATTERY MODULE AND DEVICE

CROSS-REFERENCE OF RELATED APPLICATIONS

This application is a continuation of International Application No. PCT/CN2020/110837 filed on Aug. 24, 2020, which claims the priority of the Chinese patent application No. 202010306786.5 entitled "End Cover Assembly, Battery Cell, Battery Module and Device" filed on Apr. 17, 2020, both of which are incorporated herein by reference in their entireties.

TECHNICAL FIELD

The present application relates to the technical field of energy storage apparatus, and in particular to an end cover assembly, a battery cell, a battery module and a device.

BACKGROUND

With the development of science and technology, the application fields of rechargeable battery cells have become more and more extensive, and for example, battery cells can be used in vehicles, electric bicycles, or wireless power tools, etc. At the same time, the requirement for safety performance of battery cells is getting higher and higher.

At present, a battery cell in the prior art usually includes a housing, an electrode assembly positioned in the housing, and an end cover assembly disposed at an opening of the housing in covering manner. The end cover assembly is provided with parts such as an insulating member and an electrode terminal, and the safety performance of the end cover assembly directly affects the safety performance of the entire battery cell.

SUMMARY

The present application provides an end cover assembly, a battery cell, a battery module and a device, aiming to improve the safety performance of the end cover assembly.

The embodiment of a first aspect of the present application provides an end cover assembly for a battery cell, the end cover assembly includes an end cover; an electrode terminal disposed on the end cover; an insulating member for insulating the electrode terminal and the end cover and disposed to surround the electrode terminal, wherein the insulating member abuts the electrode terminal, at least one of the insulating member and the electrode terminal is provided with a stress relief groove, the stress relief groove is configured to absorb stress generated by the electrode terminal's abutting the insulating member.

According to an embodiment of the first aspect of the present application, the insulating member is provided with a through hole, the electrode terminal includes a columnar portion, and the columnar portion is disposed in the through hole and abuts at least part of a hole wall of the through hole;

the stress relief groove is disposed along a circumferential direction of the through hole to absorb radial stress generated by the columnar portion's abutting the hole wall.

According to an embodiment of one aspect of the present application, the stress relief groove is disposed on the electrode terminal, and the stress relief groove is formed by recessing an outer wall of the columnar portion.

According to an embodiment of one aspect of the present application, the stress relief groove is provided on the insulating member;

the stress relief groove is formed by recessing the hole wall; or part of the hole wall protrudes to form more than two protrusions, the protrusions abut the columnar portion, and the two or more protrusions are distributed at intervals along the circumferential direction of the columnar portion so that the stress relief groove is formed between two adjacent protrusions.

According to an embodiment of one aspect of the present application, multiple stress relief grooves are disposed, and the multiple stress relief grooves are symmetrically disposed along the circumferential direction of the through hole.

According to an embodiment of one aspect of the present application, a cross section of the stress relief groove perpendicular to an axial direction is V-shaped, U-shaped or arc-shaped.

According to an embodiment of one aspect of the present application, the stress relief groove is provided on the insulating member;

the stress relief groove is formed by recessing a surface of the insulating member away from the end cover; and/or the stress relief groove is formed by recessing a surface of insulating member facing the end cover.

According to an embodiment of one aspect of the present application, the stress relief groove is ring-shaped and disposed around the electrode terminal; or multiple stress relief grooves are disposed, and the multiple stress relief grooves are distributed at intervals around the electrode terminals.

According to an embodiment of one aspect of the present application, the end cover includes a connecting hole, and the electrode terminal is disposed in the connecting hole;

the insulating member includes a main body portion and a positioning portion connected to the main body portion, and the positioning portion is disposed in the connecting hole.

The embodiment of a second aspect of the present application further provides a battery cell, including a housing, an electrode assembly positioned in the housing, and an end cover assembly disposed at an opening of the housing in covering manner, the end cover assembly being the aforementioned end cover assembly.

According to an embodiment of the second aspect of the present application, the insulating member is provided with a through hole, the electrode terminal includes a columnar portion, and the columnar portion is disposed in the through hole and abuts at least part of a hole wall of the through hole;

the stress relief groove is disposed along the circumferential direction of the through hole to absorb radial stress generated by the columnar portion's abutting the hole wall.

According to an embodiment of the second aspect of the present application, the stress relief groove is provided in the electrode terminal, and the stress relief groove is formed by recessing an outer wall of the columnar portion.

According to an embodiment of the second aspect of the present application, the stress relief groove is provided in the insulating member;

the stress relief groove is formed by recessing the hole wall; or part of the hole wall protrudes to form more than two protrusions, the protrusions abut the columnar portion, and the two or more protrusions are distributed at intervals along a circumferential direction of the columnar portion so that the stress relief groove is formed between two adjacent protrusions.

According to an embodiment of the second aspect of the present application, the stress relief groove is provided in the insulating member;

the stress relief groove is formed by recessing a surface of the insulating member away from the end cover; and/or the stress relief groove is formed by recessing a surface of the insulating member facing the end cover.

According to an embodiment of the second aspect of the present application, the stress relief groove is ring-shaped and disposed around the electrode terminal; or multiple stress relief grooves are disposed, and the multiple stress relief grooves are distributed around the electrode terminal at intervals.

According to an embodiment of the second aspect of the present application, multiple stress relief grooves are disposed, and the multiple stress relief grooves are symmetrically disposed along the circumferential direction of the through hole.

According to an embodiment of the second aspect of the present application, a cross section of the stress relief groove perpendicular to an axial direction is V-shaped, U-shaped or arc-shaped.

According to an embodiment of the second aspect of the present application, the end cover includes a connecting hole, and the electrode terminal is disposed in the connecting hole;

the insulating member includes a main body portion and a positioning portion connected to the main body portion, and the positioning portion is disposed in the connecting hole.

The embodiment of a third aspect of the present application also provides a battery module including the above-mentioned battery cell.

The embodiment of a fourth aspect of the present application further provides a device including the above-mentioned battery cell, and the battery cell is used to provide electrical energy.

In the end cover assembly of the embodiment of the present application, the end cover assembly includes an end cover, an electrode terminal, and an insulating member, the insulating member is used to insulate the electrode terminal and the end cover, and the insulating member is disposed to surround the electrode terminal. When the insulating member is disposed to surround the electrode terminal, the insulating member and the electrode terminal abut against each other, when the electrode terminal is deformed or shaken, the insulating member is easily cracked. The embodiment of the present application is provided with a stress relief groove on the insulating member and/or the electrode terminal, and the stress relief groove can absorb the stress generated when the electrode terminal abuts the insulating member, thereby reducing the stress which the insulating member received, and preventing the insulating member from cracking and affecting the safety performance of the end cover assembly. Therefore, the embodiments of the present application can improve the safety performance of the end cover assembly.

BRIEF DESCRIPTION OF THE DRAWINGS

By reading the following detailed description of the non-limiting embodiments with reference to the accompanying drawings, other features, purposes and advantages of the present application will become more apparent, wherein the same or similar reference signs represent the same or similar features.

Figure 1:
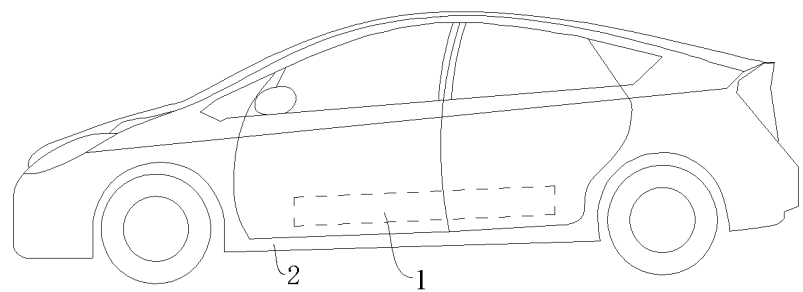
FIG. 1 is a structural schematic diagram of a vehicle provided by an embodiment of the present application.

DESCRIPTION OF REFERENCE SIGNS 1. battery pack; 10. battery cell; 11. battery module; 12. case; 2. vehicle body;
100. end cover assembly;
110. end cover; 111. connecting hole;
120. first insulating member; 120a. main body portion; 120b. positioning portion; 121. through hole; 121a. first through hole; 121b. second through hole; 122. hole wall; 123. protrusion;
130. electrode terminal; 130a. first electrode terminal; 130b. second electrode terminal; 131. columnar portion;
140. stress relief groove;
150. adapting piece;
160. second insulating member;
170. sealing ring;
180. connecting end plate;
200. housing;
300. electrode assembly; 310. first tab; 320. second tab; X. thickness direction; Y. width direction; Z. height direction.

DETAILED DESCRIPTION

The features and exemplary embodiments of various aspects of the present application will be described in detail below. In the following detailed description, many specific details are proposed in order to provide a comprehensive understanding of this application. However, it is obvious for those skilled person in the art that this application can be implemented without some of these specific details. The following description of the embodiments is only to provide a better understanding of the present application by showing examples of the present application. In the drawings and the following description, at least part of the well-known structures and technologies are not shown in order to avoid unnecessary obscurity for the application; and for clarity, the size of some structures may be exaggerated. In addition, the features, structures or characteristics described below may be combined in one or more embodiments in any suitable manner.

In the description of this application, it should be noted that, unless otherwise specified, "plurality" means two or more; the terms "upper", "lower", "left", "right", "inner", and "outside" indicating the orientation or positional relationship is only for the convenience of describing the application and simplifying the description, rather than indicating or implying that the device or element referred to must include a specific orientation, be constructed and operated in a specific orientation, and therefore cannot be understood as restriction to the present application.

The orientation words appearing in the following description are all directions shown in the figures, and do not limit the specific structure of the embodiments of the present application. In the description of the present application, it should also be explained that, unless otherwise clearly specified and limited, the terms "installation", "connection" or the like should be understood in a broad sense, and for example, it can be a fixed connection or a detachable connection, or integral connection; it can be a direct connection or indirect connection. For the skilled person in the art, the specific meaning of the above-mentioned terms in the present application can be understood according to the specific circumstances.

In order to better understand the present application, the end cover assembly, battery cell, battery module and a device of the embodiment of the present application will be described in detail below in conjunction with FIGS. 1 to 30.

As shown in FIG. 1, an embodiment of the present application firstly provides a vehicle. The vehicle includes a battery pack 1 and a vehicle body 2, and the battery pack 1 is disposed on the vehicle body 2.

The vehicle is a new energy vehicle, which can be a pure electric vehicle, a hybrid vehicle or an extended-range vehicle, or a two-wheel or three-wheel electric vehicle. The vehicle body 2 is provided with a driving motor, which is electrically connected to the battery pack 1 and is provide with electrical energy by the battery pack 1. The driving motor is connected to the wheels on the vehicle body 2 through a transmission mechanism to drive the vehicle. For example, the battery pack 1 may be horizontally disposed in the bottom of the vehicle body 2.

Figure 2:
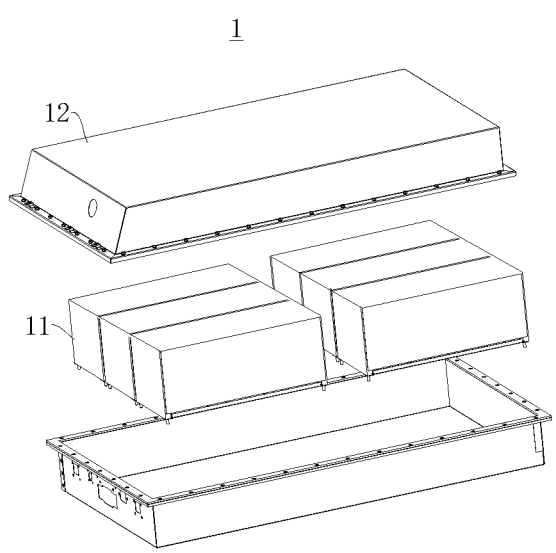
FIG. 2 is a structural schematic diagram of a battery pack provided by an embodiment of the present application.

Also referring to FIG. 2, the battery pack 1 is disposed in many ways. In some optional embodiments, the battery pack 1 includes a case 12 and a battery module 11 disposed in the case 12.

The number of the battery module 11 is one or more, and a plurality of battery modules 11 are arranged and disposed in the case 12. The type of the case 12 is not limited, and the case 12 may be a frame-shaped case, a disk-shaped case, or a box-shaped case. The case 12 may include a lower case for accommodating the battery module and an upper case for covering the lower case.

Figure 3:
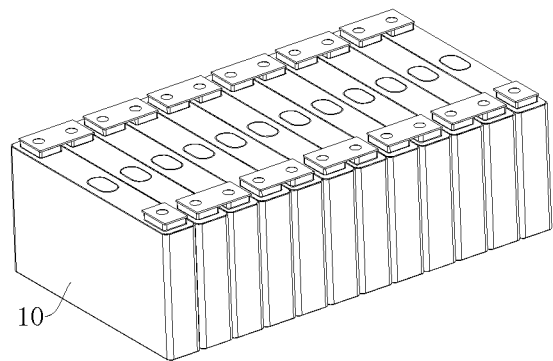
FIG. 3 is a structural schematic diagram of a battery module provided by an embodiment of the present application.

Also referring to FIG. 3, the battery module 11 may have various arrangements. In some optional embodiments, the battery module 11 includes a receiving portion (not shown in the figures) and a plurality of battery cells 10 positioned in the receiving portion, the battery cells 10 are disposed side by side in the receiving portion.

The receiving portion is disposed in many ways, for example, the receiving portion includes a housing and a cover plate disposed at the housing in covering manner; or, the receiving portion includes side plates and end plates that are successively enclosed and connected; or, the receiving portion includes end plates disposed oppositely and a strap surrounding the end plate and the battery cell; or, the receiving portion includes a side plate, an end plate and a strap.

The battery cell 10 can be used not only in vehicles but also in other devices. The embodiment of the present application also provides a device that uses the battery cell 10 as a power source, the device can be, but is not limited to, a vehicle, a ship, or an aircraft.

Figure 4:
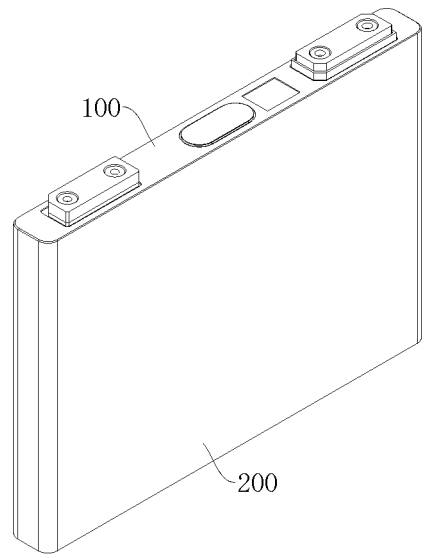
FIG. 4 is a schematic diagram of a stereo structure of a battery cell provided by an embodiment of the present application.
Figure 5:
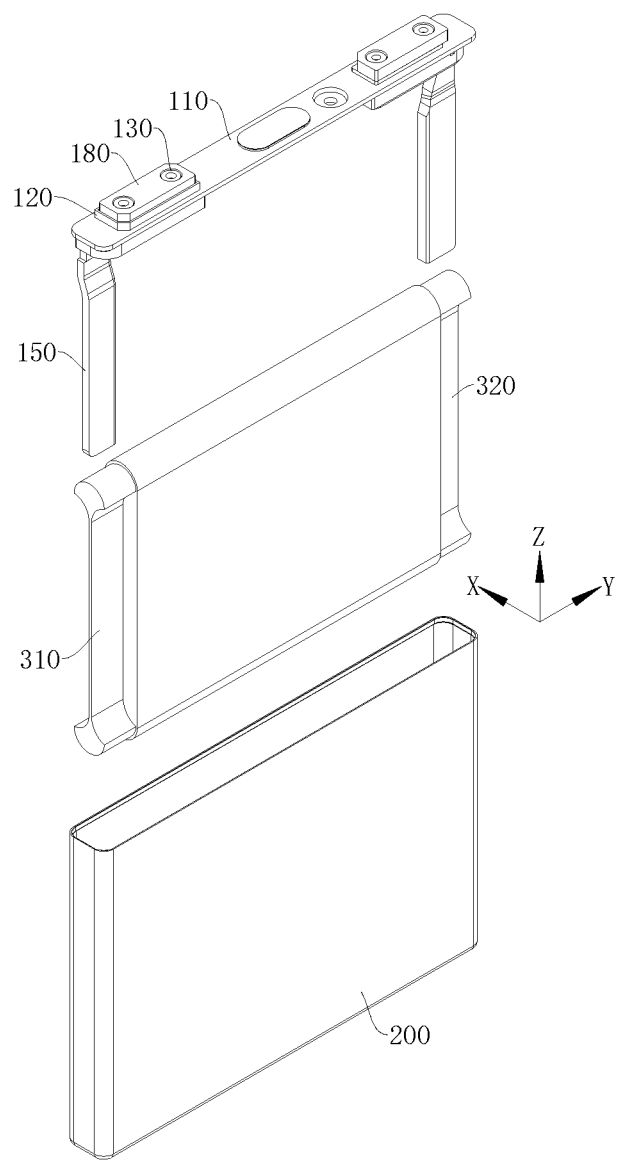
FIG. 5 is a schematic diagram of the exploded structure of FIG. 4.

The battery cell 10 is disposed in many ways, in some alternative embodiments, also referring to FIGS. 4 to 5, FIG. 4 is a schematic diagram of a stereo structure of a battery cell 10 provided by an embodiment of the application; FIG. 5 is a schematic diagram of the exploded structure of FIG. 4. According to a battery cell 10 provided by an embodiment of the present application, the battery cell 10 is a prismatic battery cell 10.

Figure 7:
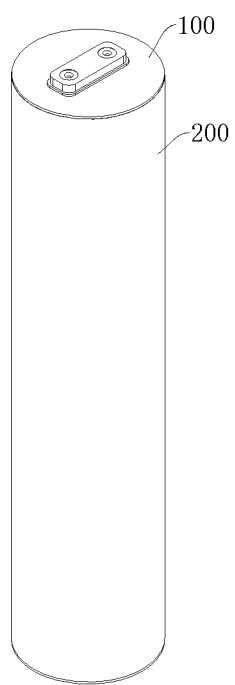
FIG. 7 is a schematic diagram of a stereo structure of a battery cell provided by another embodiment of the present application.
Figure 8:
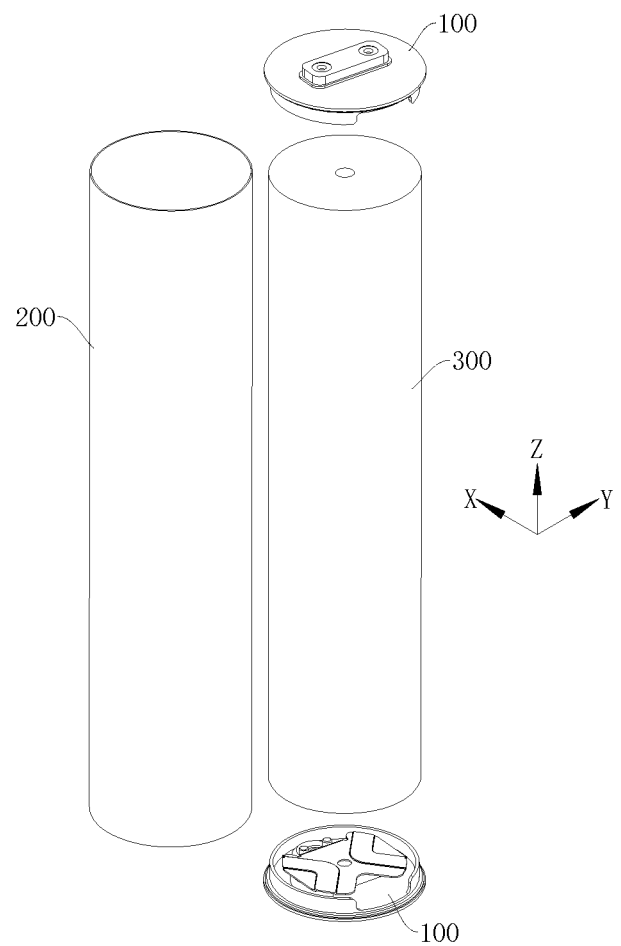
FIG. 8 is a schematic diagram of the exploded structure of FIG. 7.

In other alternative embodiments, also referring to FIGS. 7 and 8, FIG. 7 is a schematic diagram of a stereo structure of a battery cell 10 provided by another embodiment of the application, and FIG. 8 is a schematic diagram of the exploded structure of FIG. 7. According to the battery cell 10 provided by another embodiment of the present application, the battery cell 10 is a cylindrical battery cell 10.

Figure 6:
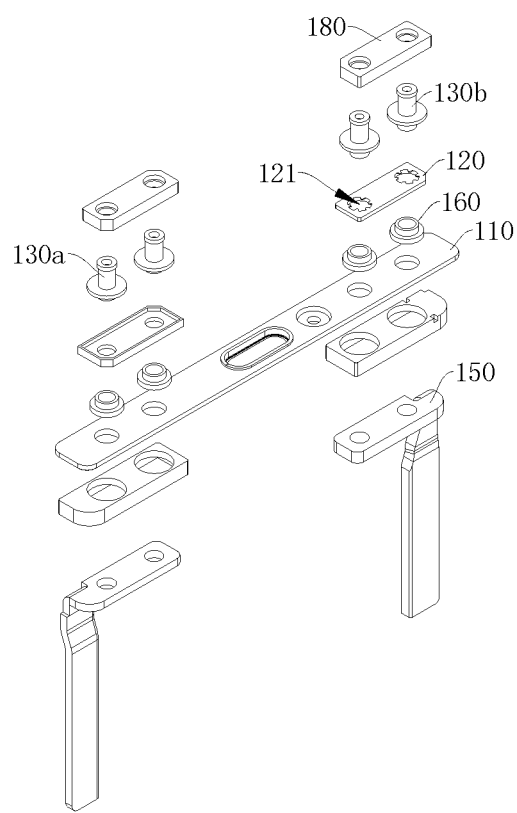
FIG. 6 is a schematic diagram of the exploded structure of the top cover assembly in FIG. 4.
Figure 9:
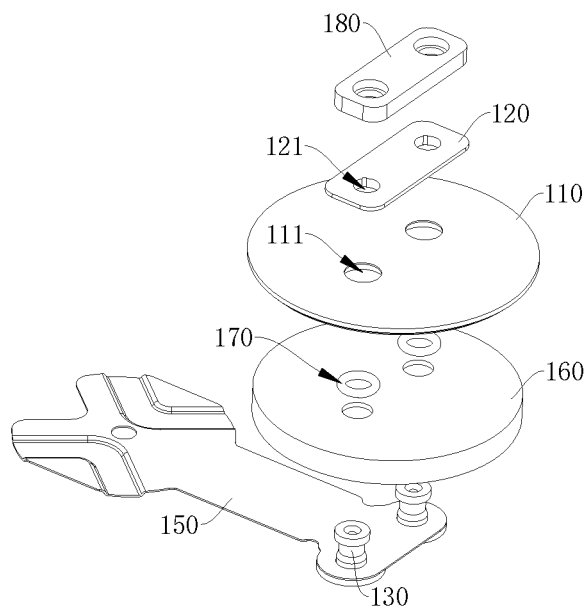
FIG. 9 is a schematic diagram of the exploded structure of the top cover assembly in FIG. 7.

Also referring to FIGS. 6 and 9, FIG. 6 is a schematic diagram of the exploded structure of the top cover assembly of a prismatic battery cell 10 provided by an embodiment of the present application, and FIG. 9 is a schematic diagram of the exploded structure of the top cover assembly of a cylindrical battery cell provided by another embodiment of the present application. According to the battery cell 10 provided by the embodiment of the present application, both the prismatic battery cell 10 and the cylindrical battery cell 10 include a housing 200, an electrode assembly 300 positioned in the housing 200, and an end cover assembly 100 disposed at an opening of the housing 200 in covering manner.

The electrode assembly 300 includes a tab, and the tab is connected to the electrode terminal 130 on the end cover assembly 100 through the adapting piece 150, thereby outputting the electrical energy generated by the electrode assembly 300 to the outside.

For example, two tabs are disposed, the two tabs are a first tab 310 and a second tab 320. For example, two electrode terminals 130 are disposed, and the two electrode terminals 130 are a first electrode terminal 130a and a second electrode terminal 130b respectively. The first electrode terminal 130a and the second electrode terminal 130b are respectively connected to the first tab 310 and the second tab 320.

When the battery cell 10 is a prismatic battery cell 10, the electrode assembly 300 of the prismatic battery cell 10 includes, for example, a first pole piece, a second pole piece, and a separator (not shown in the figures), and the first pole piece and the second pole piece are insulated by the separator. The first pole piece, the second pole piece and the separator can be wound or laminated to form the electrode assembly 300, and a chemical reaction occurs between the electrode assembly 300 and the electrolyte to generate electrical energy. The first pole piece is, for example, a positive electrode sheet, and the second pole piece is, for example, a negative electrode sheet. The positive electrode active material can be coated on the coated area of the positive electrode sheet, and the negative electrode active material can be coated on the coating area of the negative electrode sheet. The uncoated part extending from the coated area of the positive electrode sheet is used as a positive electrode tab, for example, the first tab 310 may be the positive electrode tab; the uncoated part extending from the coated area of the negative electrode sheet is used as a negative electrode tab, for example, the second tab 320 may be a negative electrode tab. The first pole piece is electrically connected to the first electrode terminal 130a through the first tab 310, and the second pole piece is electrically connected to the second electrode terminal 130b through the second tab 320, thereby outputting the generated electrical energy to the outside. Both the electrode terminal 130a and the second electrode terminal 130b are provided on the end plate assembly 100.

The first tab 310 and the second tab 320 of the prismatic battery cell 10 are, for example, respectively provided on both sides of the battery cell 10 in a width direction (the Y direction in FIG. 5). The first tab 310 and the second tab 320 of the prismatic battery cell 10 may also be, for example, disposed on one side of the battery cell 10 in a height direction (the Z direction in FIG. 5). The first tab 310 and the second tab 320 of the cylindrical battery cell 10 may be, for example, respectively provided on two sides of the battery cell 10 in the height direction (the Z direction in FIG. 8).

The cylindrical battery cell 10 includes, for example, two end cover assemblies 100, and the two end cover assemblies 100 are respectively provided on two sides of the cylindrical battery cell 10 in the height direction. The cylindrical battery cell 10 may also include only one end cover assembly 100.

In some optional embodiments, the end cover assembly 100 further includes an end cover 110 and an insulating member. The electrode terminal 130 is disposed on the end cover 110. The insulating member is used to insulate the electrode terminal 130 and the end cover 110, and the insulating member is disposed to surround the electrode terminal 130.

The position where the insulating member is disposed is not limited, for example, the insulating member is a first insulating member 120 disposed on the side of the end cover 110 away from the electrode assembly 300, or the insulating member is a second insulating member 160 disposed on the side of the end cover 110 facing the electrode assembly 300. Or the insulating member includes both the first insulating member 120 and the second insulating member 160. In embodiments of the present application, the first insulating member 120 is taken as an example to illustrate the concept of the embodiment of the present application.

When the first insulating member 120 is disposed to surround the electrode terminal 130, the first insulating member 120 and the electrode terminal 130 abut against each other. When the electrode terminal 130 is deformed or shaken, the first insulating member 120 is easily cracked. For example, when the electrode terminal 130 is fixed to the end cover 110 by riveting, the electrode terminal 130 will expand during the riveting process, so that the electrode terminal 130 will squeeze the first insulating member 120, and the first insulating member 120 is stressed and may deform and crack. When the first insulating member 120 cracks to form a crack, the metal particles may fall into the crack to reduce a creepage distance between the electrode terminal 130 and the end cover 110, causing a short circuit of the end cover assembly 100 and affecting safety performance of the end cover assembly 100.

Figure 10:
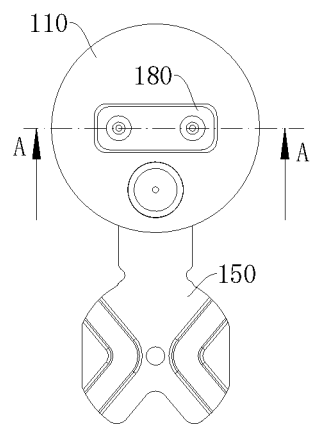
FIG. 10 is a top view of the top cover assembly in FIG. 7.
Figure 11:
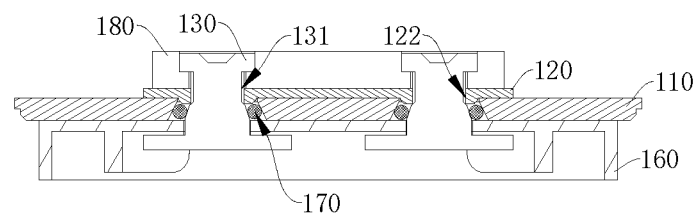
FIG. 11 is a cross sectional view at A-A in FIG. 10.

Below the cylindrical end cover assembly 100 is taken as an example to illustrate the concept of the embodiment of the present application. Also referring to FIG. 10 and FIG. 11, FIG. 10 is a top view of an end cover assembly 100 provided by an embodiment of the present application, and FIG. 11 is a cross sectional view at A-A in FIG. 10.

According to the end cover assembly 100 provided by the embodiment of the present application, the end cover assembly 100 includes an end cover 110; an electrode terminal 130 disposed on the end cover 110; a first insulating member 120 for insulating the electrode terminal 130 and the end cover 110 and disposed to surround the electrode terminal 130, wherein the first insulating member 120 abut the electrode terminal 130, at least one of the first insulating member 120 and the electrode terminal 130 is provided with a stress relief groove 140, and the stress relief groove 140 is configured to absorb the stress generated by the electrode terminal's 130 abutting the insulating member.

In embodiments of the present application, a stress relief groove 140 is provided on the first insulating member 120 and/or the electrode terminal 130, and the stress relief groove 140 can absorb the stress generated when the electrode terminal 130 abuts the first insulating member 120, thereby reducing the stress received by the first insulating member 120, preventing the first insulating member 120 from cracking, and preventing a crack from affecting the safety performance of the end cover 110; thus the embodiments of the present application can improve the safety performance of the end cover assembly 100.

When the second insulating member 160 is disposed to surround the electrode terminal 130, at least one of the second insulating member 160 and the electrode terminal 130 is provided with a stress relief groove 140.

Figure 12:
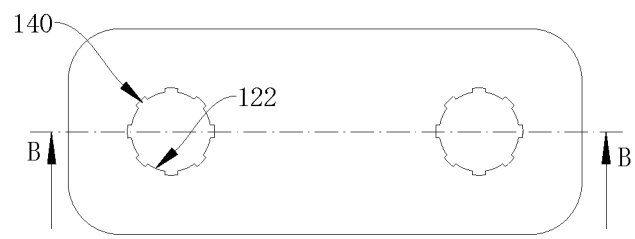
FIG. 12 is a top view of an insulating member of a top cover assembly provided by an embodiment of the present application.
Figure 13:
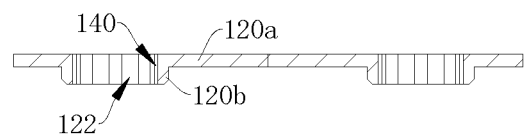
FIG. 13 is a cross sectional view at B-B in FIG. 12.
Figure 14:
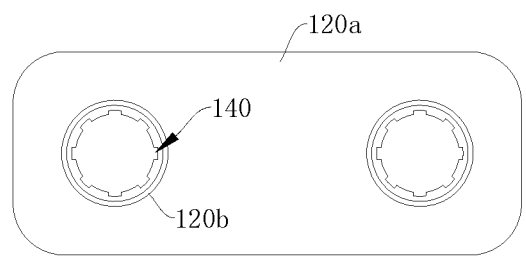
FIG. 14 is a bottom view of an insulating member of a top cover assembly provided by an embodiment of the present application.
Figure 15:
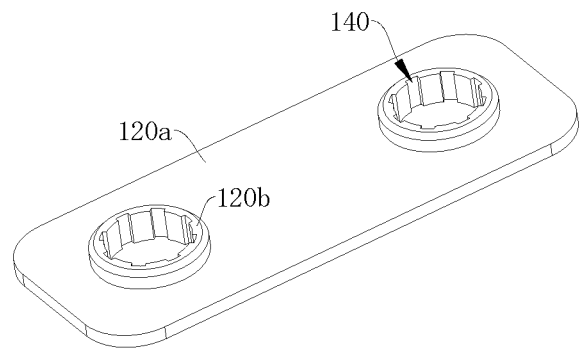
FIG. 15 is a stereo view of an insulating member of a top cover assembly provided by an embodiment of the present application.

Also referring to FIGS. 12 to 15, FIG. 12 is a top view of a first insulating member 120 provided by to an embodiment of the present application, FIG. 13 is a cross sectional view at BB in FIG. 12, FIG. 14 is a bottom view of a first insulating member 120 provided by an embodiment of the present application, and FIG. 15 is a stereo view of a first insulating member 120 provided by an embodiment of the present application.

According to some embodiments of the present application, when the electrode terminal 130 includes the first electrode terminal 130a and the second electrode terminal 130b, the first electrode terminal 130a and the second electrode terminal 130b may be surrounded by the same first insulating member 120.

In some other optional embodiments, the end cover assembly 100 may be disposed to surround the first electrode terminal 130a and the second electrode terminal 130b through two first insulating members 120, respectively. At least one of the two first insulating members 120, the first electrode terminal 130a and the second electrode terminal 130b is provided with a stress relief groove 140 to absorb the stress generated by the electrode terminal's 130 abutting the first insulating member 120. Optionally, a stress relief groove 140 is provided in each group of the first insulating member 120 and the electrode terminal 130 that are engaged with each other to absorb the stress generated when each electrode terminal 130 abuts each first insulating member 120.

In some optional embodiments, the end cover assembly 100 further includes a connecting end plate 180 which is disposed on a side of the first insulating member 120 away from the end cover 110, and the electrode terminal 130 is connected to the connecting end plate 180. For example, the connecting end plate 180 is provided with a riveting hole, and one end of the electrode terminal 130 is positioned in the riveting hole.

For example, the electrode terminal 130 extends from the side of the first insulating member 120 facing the end cover 110 into the first insulating member 120, and then the electrode terminal 130 continues to extend into the riveting hole of the connecting end plate 180 to perform a riveting operation on the electrode terminal 130, so that the electrode terminal 130 is riveted in the riveting hole. The first insulating member 120 is squeezed and disposed between the connecting end plate 180 and the end cover 110, when the first insulating member 120 is subjected to the stress generated by the abutment of the electrode terminal 130, the first insulating member 120 is easily cracked, which makes the creepage distance between the connecting end plate 180 and the end cover 110 difficult to guarantee. By providing the stress relief groove 140 in embodiments of the present application, the possibility that the first insulating member 120 cracks and a short circuit of the end cover assembly 100 is thus caused can be reduced, so the safety performance of the end cover 110 is improved.

In some optional embodiments, the first insulating member 120 is provided with a through hole 121. The electrode terminal 130 includes a columnar portion 131 which is inserted into the through hole 121 and is connected to at least part of the hole wall 122 of the through hole 121. The hole wall 122 of the through hole 121 refers to a wall surface of the first insulating member 120 facing the through hole 121.

The stress relief groove 140 can be disposed in various positions. In some alternative embodiments, the stress relief groove 140 is disposed along a circumferential direction of the through hole 121 to absorb radial stress generated by the columnar portion's 131 abutting the hole wall 122. The radial direction is a direction perpendicular to the axial direction of the through hole 121, the axial direction of the through hole 121 is the height direction, and the radial direction is, for example, the width direction or the thickness direction.

In these alternative embodiments, the columnar portion 131 abuts at least part of the hole wall 122, and the columnar portion 131 may provide radial stress to the hole wall 122. The stress relief groove 140 is provided on the circumferential side of the through hole 121 so that the stress relief groove 140 can absorb the stress in the radial direction, thereby preventing the first insulating member 120 from cracking.

The stress relief groove 140 may be provided in the first insulating member 120 and/or the columnar portion 131 to absorb the radial stress generated by the columnar portion's 131 abutting the first insulating member 120.

In some optional embodiments, the stress relief groove 140 is provided in the first insulating member 120. When the stress relief groove 140 is disposed on the first insulating member 120, the stress relief groove 140 may be disposed on the hole wall 122, or the stress relief groove 140 may be disposed on the surface of the first insulating member 120 facing the end cover 110, or the stress relief groove 140 may be disposed on the surface of the first insulating member 120 away from the end cover 110.

For example, the stress relief groove 140 is disposed on the hole wall 122, and the stress relief groove 140 is formed by recessing the hole wall 122. The contact area between the hole wall 122 and the columnar portion 131 can be reduced, and the stress relief groove 140 can provide a certain deformation space for the first insulating member 120, thereby preventing the first insulating member 120 from cracking.

Figure 16:
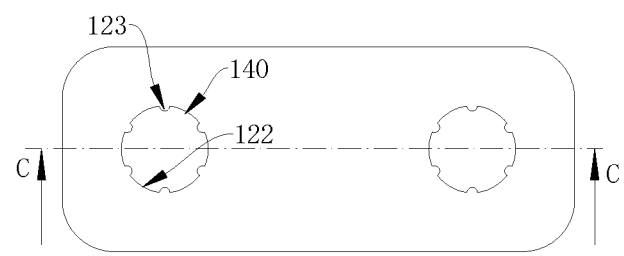
FIG. 16 is a top view of an insulating member of a top cover assembly according to another embodiment of the present application.
Figure 17:
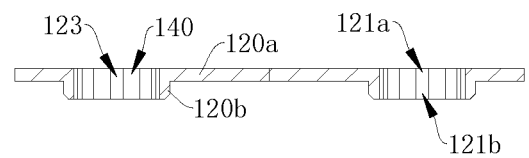
FIG. 17 is a cross sectional view at C-C in FIG. 16.
Figure 18:
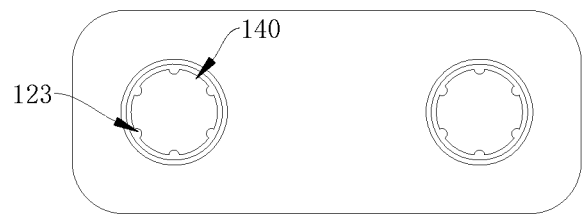
FIG. 18 is a bottom view of an insulating member of a top cover assembly provided by another embodiment of the present application.

In other alternative embodiments, also referring to FIGS. 16 to 18, FIG. 16 is a top view of a first insulating member 120 provided by another embodiment of the application, and FIG. 17 is a cross sectional view at C-C in FIG. 16, and FIG. 18 is a bottom view of a first insulating member 120 provided by another embodiment of the present application.

According to another embodiment of the present application, more than two protrusions 123 protrudes from part of the hole wall 122 and the protrusions 123 abut the columnar portion 131. The protrusions 123 are distributed at intervals along the circumferential direction of the electrode terminal 130 so that a stress relief groove 140 is formed between the two adjacent protrusions 123. The columnar portion 131 and the protrusions 123 abut against each other, which can further reduce the contact area between the columnar portion 131 and the first insulating member 120. A stress relief groove 140 is formed between the two adjacent protrusions 123, which can provide deformation space for the deformation of the protrusions 123 and other portions of the first insulating member 120, thereby preventing the first insulating member 120 from cracking.

Figure 19:
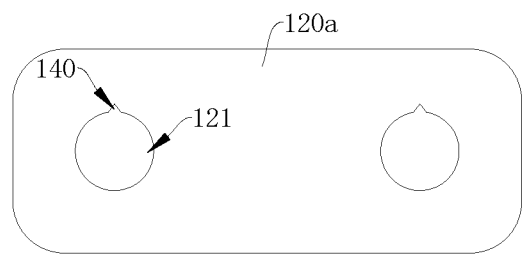
FIG. 19 is a top view of an insulating member of a top cover assembly according to further another embodiment of the present application.
Figure 20:
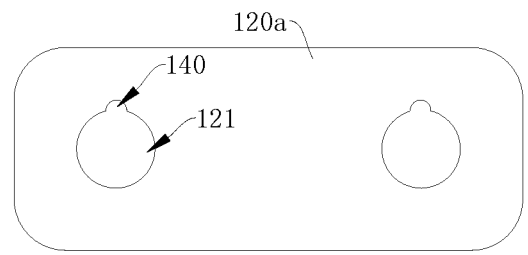
FIG. 20 is a top view of an insulating member of a top cover assembly according to yet another embodiment of the present application.

When the stress relief groove 140 is provided on the columnar portion 131 and/or the hole wall 122, the stress relief groove 140 is distributed in many ways, also referring to FIGS. 19 and 20, the number of the stress relief groove 140 can be one, one stress relief groove 140 is positioned on the circumferential side of the through hole 121.

In other optional embodiments, multiple stress relief grooves 140 are disposed, and the multiple stress relief grooves 140 are symmetrically distributed in the circumferential direction of the through hole 121. The plurality of symmetrically distributed stress relief grooves 140 can ensure that the first insulating member 120 is stressed in more balanced manner, and prevent the first insulating member 120 from being partially stressed too large and cracking.

The stress relief groove 140 may take various shape, and when the stress relief groove 140 is disposed on the hole wall 122 or the columnar portion 131, the cross section of the stress relief groove 140 perpendicular to the axial direction is V-shaped, U-shaped or arc-shaped. The cross section of the stress relief groove 140 perpendicular to the axial direction may also include other shapes, as long as the stress relief groove 140 can absorb the stress when the electrode terminal 130 abuts the first insulating member 120.

In some optional embodiments, the end cover 110 is provided with a connecting hole 111, and the electrode terminal 130 is disposed in the connecting hole 111, for example, the columnar portion 131 is disposed through the connecting hole 111. The first insulating member 120 includes a main body portion 120a and a positioning portion 120b connected to the main body portion 120a, and the positioning portion 120b is disposed in the connecting hole 111 so as to increase the creepage distance between the columnar portion 131 and the end cover 110 and improve the safety performance of the end cover assembly 100.

In some optional embodiments, the end cover assembly 100, for example, further includes a sealing ring 170. The sealing ring 170 is disposed to surround the columnar portion 131, and the sealing ring 170 is positioned on the side of the positioning portion 120b away from the main body 120a to further improve the safety performance of the end cover assembly 100.

The positioning portion 120b, for example, is in a cylindrical shape and the through hole 121 includes a first through hole 121a positioned in the main body portion 120a and a second through hole 121b positioned in the positioning portion 120b.

The size of the first through hole 121a and the second through hole 121b is not limited, and in some optional embodiments, as shown in FIG. 17, the second through hole 121b includes the same radial size as the first through hole 121a, for example.

Figure 21:
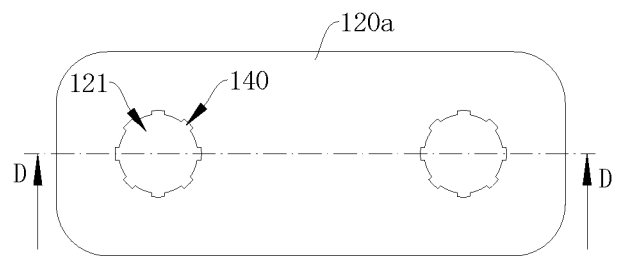
FIG. 21 is a top view of an insulating member of a top cover assembly according to still another embodiment of the present application.
Figure 22:
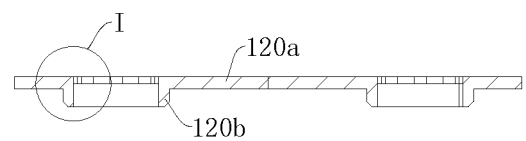
FIG. 22 is a cross sectional view at D-D in FIG. 21.
Figure 23:
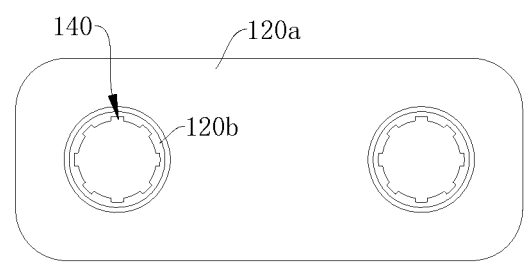
FIG. 23 is a bottom view of an insulating member of a top cover assembly provided by still another embodiment of the present application.
Figure 24:
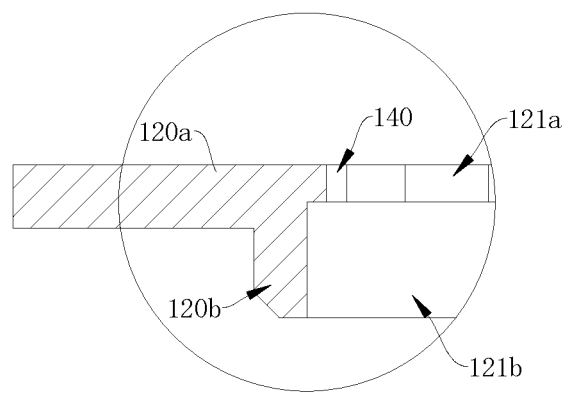
FIG. 24 is a schematic diagram of a partial enlarged structure at I in FIG. 22.

Alternatively, in further other alternative embodiments, also referring to FIGS. 21 to 24, FIG. 21 is a top view of a first insulating member 120 provided by further another embodiment of the present application, FIG. 22 is a cross sectional view at D-D in FIG. 21, FIG. 23 is a bottom view of a first insulating member 120 provided by further another embodiment of the present application, and FIG. 24 is a schematic diagram of partial enlarged structure at I in FIG. 22.

According to further another embodiment of the present application, the radial size of the second through hole 121b is greater than the radial size of the first through hole 121a, so that the hole wall 122 of the second through hole 121b and the columnar portion 131 are separated by a predetermined distance, which prevents the positioning portion 120b from cracking caused by pressing the positioning portion 120b when the columnar portion 131 is expanded, deformed or shaken.

When the stress relief groove 140 is disposed on the hole wall 122, the stress relief groove 140 may be correspondingly disposed on the main body portion 120a, or the stress relief groove 140 may extend from the main body portion 120a to the positioning portion 120b. The positioning portion 120b is provided with a stress relief groove 140 to prevent the positioning portion 120b from being stressed and cracking.

Figure 25:
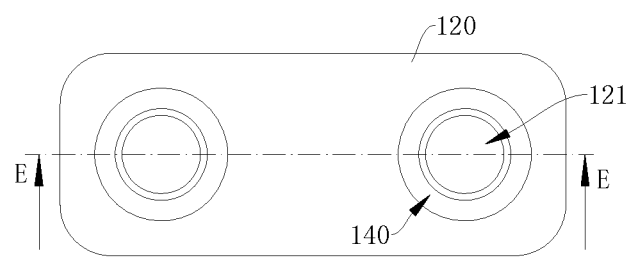
FIG. 25 is a top view of an insulating member of a top cover assembly provided by still another embodiment of the present application.
Figure 26:
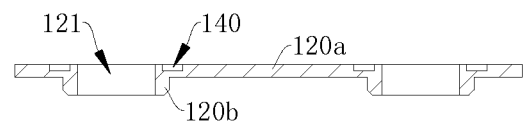
FIG. 26 is a cross sectional view at E-E in FIG. 25.
Figure 27:
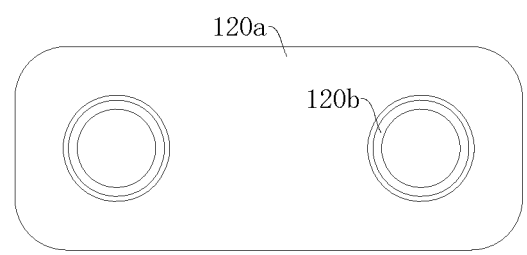
FIG. 27 is a bottom view of an insulating member of a top cover assembly provided by still another embodiment of the present application.
Figure 28:
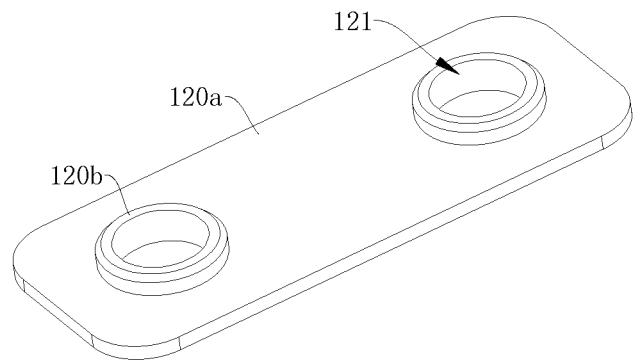
FIG. 28 is a stereo view of an insulating member of a top cover assembly according to still another embodiment of the present application.

In still other alternative embodiments, also referring to FIGS. 25 to 28, FIG. 25 is a top view of a first insulating member 120 provided by still another embodiment of the present application, FIG. 26 is a cross sectional view at E-E in FIG. 25, FIG. 27 is a bottom view of a first insulating member 120 provided by still another embodiment of the present application. FIG. 28 is a schematic diagram of a stereo structure of a first insulating member 120 provided by still another embodiment of the present application.

According to still another embodiment of the present application, the stress relief groove 140 is provided on the surface of the first insulating member 120 facing the end cover 110, and the stress relief groove 140 is formed by recessing the surface of the first insulating member 120 facing the end cover 110. The stress relief groove 140 may also be provided on the surface of the first insulating member 120 away from the end cover 110, and the stress relief groove 140 is formed by recessing the surface of the first insulating member 120 away from the end cover 110. Alternatively, both the surface of the first insulating member 120 facing the end cover 110 and the surface away from the end cover 110 are provided with a stress relief groove 140. In these alternative embodiments, the stress relief groove 140 can provide a deformation space for the first insulating member 120, thereby preventing the first insulating member 120 from cracking.

When the stress relief groove 140 is provided on the surface of the first insulating member 120 facing the end cover 110 and the surface away from the end cover 110, the stress relief groove 140 is, for example, ring-shaped. The ring-shaped stress relief groove 140 is disposed around the through hole 121, and the stress relief groove 140 can absorb stress at different positions in the circumferential direction of the through hole 121.

Figure 29:
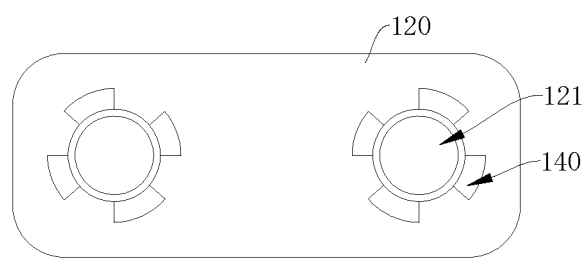
FIG. 29 is a top view of an insulating member of a top cover assembly according to still another embodiment of the present application.

Alternatively also referring to FIG. 29, in still some other alternative embodiments, multiple stress relief grooves 140 are disposed, and the multiple stress relief grooves 140 are symmetrically distributed in the circumferential direction of the through hole 121, so that the first insulating member 120 is stressed more uniformly. In FIG. 29, four stress relief grooves 140 are disposed, and the four stress relief grooves 140 are symmetrically distributed in the circumferential direction of the through hole 121.

Figure 30:
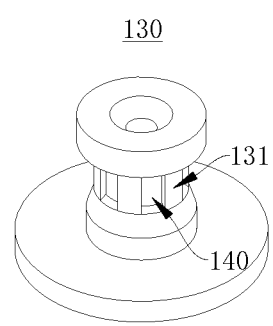
FIG. 30 is a structural schematic diagram of an electrode terminal of a top cover assembly provided by an embodiment of the present application.

Also referring to FIG. 30, in other alternative embodiments, the stress relief groove 140 is disposed on the electrode terminal 130, and the stress relief groove 140 is formed by recessing the outer wall of the columnar portion 131. That is, the columnar portion 131 abuts against the hole wall 122 through at least part of the outer wall, and the stress relief groove 140 is provided on the outer wall, which can reduce the contact area between the columnar portion 131 and the hole wall 122, and can reduce the deformation amount of the columnar portion 131, further reducing the radial force exerted by the columnar portion 131 on the hole wall 122, and preventing the first insulating member 120 from cracking.

It should be noted that when the hole wall 122 and the outer wall of the columnar portion 131 are both provided with a stress relief groove 140, the stress relief groove 140 of the hole wall 122 and the stress relief groove 140 of the outer wall of the columnar portion 131 are disposed oppositely, so that the stress relief groove 140 is hollow, for example, when the hole wall 122 is provided with a protrusion 123, the protrusion 123 on the hole wall 122 and the stress relief groove 140 on the outer wall of the columnar portion 131 are misaligned, so as to prevent the protrusion 123 from being positioned in the stress relief groove 140 and affecting the function of the stress relief groove 140.

In some optional embodiments, both the first insulating member 120 and the electrode terminal 130 are provided with a stress relief groove 140. The stress relief groove 140 on the first insulating member 120 is provided on the surface facing and/or away from the end cover 110, and the stress relief groove 140 on the electrode terminal 130 is provided on its outer wall.

Alternatively, in other optional embodiments, the first insulating member 120 is provided with a stress relief groove 140, and the stress relief groove 140 includes a first stress relief groove 140 disposed on the surface of the first insulating member 120 facing and/or facing away from the end cover 110 and a second stress relief groove 140 disposed on the hole wall 122.

Those skilled person in the art should understand that the above-mentioned embodiments are all exemplary rather than restrictive. Different technical features appearing in different embodiments can be combined to achieve beneficial effects. Those skilled person in the art should be able to understand and implement other modified embodiments of the disclosed embodiments on the basis of studying the drawings, the description and the claims. In the claims, the term "comprising" does not exclude other means or steps; terms such as "a", "an" and "the" are not intended to refer to only a singular entity, but include a description of a plurality of entities, and can be used interchangeably with "one or at least one"; the terms "first" and "second" are used to indicate names rather than to indicate any specific order. Any reference signs in the claims should not be construed as limiting the scope of protection. The functions of multiple parts appearing in the claims can be realized by a single hardware or software module. The appearance of certain technical features in different dependent claims does not mean that these technical features cannot be combined to achieve beneficial effects.

What is claimed is:

1. An end cover assembly for a battery cell, the end cover assembly comprising:
    an end cover;
    an electrode terminal fixed to the end cover by riveting;
    an insulating member for insulating the electrode terminal and the end cover and disposed to surround the electrode terminal,
    wherein the insulating member abuts the electrode terminal radially, the insulating member is provided with a stress relief groove at the position where the insulating member abuts the electrode terminal radially, and the stress relief groove is configured to absorb radial stress generated by the electrode terminal's abutting the insulating member radially when the electrode terminal is fixed to the end cover by riveting, by providing a space of deforming radially for the insulating member,
    wherein the insulating member is provided with a through hole, the electrode terminal includes a columnar portion, and the columnar portion is disposed in the through hole and abuts at least part of a hole wall of the through hole;
    wherein
    part of the hole wall protrudes to form more than two protrusions, and the two or more protrusions are distributed at intervals along a circumferential direction of the columnar portion so that the stress relief groove is formed between two adjacent protrusions, the columnar portion abuts the top of the two or more protrusions and the columnar portion does not abut at least part of the stress relief groove so as to provide the space of deforming radially for the insulating member.

2. The end cover assembly according to claim 1, wherein
    the diameter of two ends of the electrode terminal is larger than the diameter of the columnar portion so that the electrode terminal is fixed to the end cover by riveting;
    the stress relief groove is disposed along the circumferential direction of the through hole to absorb radial stress generated by the columnar portion's abutting the hole wall.

3. The end cover assembly according to claim 2, wherein multiple stress relief grooves are disposed, and the multiple stress relief grooves are symmetrically disposed along the circumferential direction of the through hole.

4. The end cover assembly according to claim 1, wherein a cross section of the stress relief groove perpendicular to an axial direction is V-shaped, U-shaped or arc-shaped.

5. The end cover assembly according to claim 1, wherein,
    the end cover includes a connecting hole, and the electrode terminal is disposed in the connecting hole;
    the insulating member includes a main body portion and a positioning portion connected to the main body portion, and the positioning portion is disposed in the connecting hole.

6. A battery cell comprising a housing, an electrode assembly positioned in the housing, and an end cover assembly disposed at an opening of the housing in covering manner, the end cover assembly being the end cover assembly according to claim 1.

7. The battery cell according to claim 6, wherein
    the stress relief groove is disposed along the circumferential direction of the through hole to absorb radial stress generated by the columnar portion's abutting the hole wall.

8. The battery cell according to claim 7, wherein multiple stress relief grooves are disposed, and the multiple stress relief grooves are symmetrically disposed along the circumferential direction of the through hole.

9. The battery cell according to claim 6, wherein a cross section of the stress relief groove perpendicular to an axial direction is V-shaped, U-shaped or arc-shaped.

10. The battery cell according to claim 6, wherein,
    the end cover includes a connecting hole, and the electrode terminal is disposed in the connecting hole;
    the insulating member includes a main body portion and a positioning portion connected to the main body portion, and the positioning portion is disposed in the connecting hole.

11. A device comprising the battery cell according to claim 6, the battery cell being used to provide electrical energy.

12. The end cover assembly according to claim 1, wherein the end cover assembly further comprises a connecting end plate which is disposed on a side of the insulating member away from the end cover, and the electrode terminal is connected to the connecting end plate.

* * * * *